(12) United States Patent
Byeon et al.

(10) Patent No.: US 7,984,856 B2
(45) Date of Patent: Jul. 26, 2011

(54) CHEAT PREVENTING OMR CARDCHEAT PREVENTING OMR CARD

(76) Inventors: Gyu-Il Byeon, Seo-gu (KR); Jung-Ho Lee, Gangseo-gu (KR)

(*) Notice: Subject to any disclaimer, the term of this patent is extended or adjusted under 35 U.S.C. 154(b) by 416 days.

(21) Appl. No.: 12/133,678

(22) Filed: Jun. 5, 2008

(65) Prior Publication Data

US 2009/0188982 A1 Jul. 30, 2009

(30) Foreign Application Priority Data

Jan. 24, 2008 (KR) .................. 10-2008-0007698

(51) Int. Cl.
*G06K 19/00* (2006.01)
(52) U.S. Cl. ........................... 235/487; 235/454
(58) Field of Classification Search .......... 235/487, 235/454, 470, 491; 382/317
See application file for complete search history.

(56) References Cited

U.S. PATENT DOCUMENTS

| | | | | |
|---|---|---|---|---|
| 5,103,490 A | * | 4/1992 | McMillin | 382/284 |
| 6,014,454 A | * | 1/2000 | Kunkler | 382/137 |
| 6,357,658 B1 | * | 3/2002 | Garczynski et al. | 235/462.01 |
| 6,741,738 B2 | * | 5/2004 | Taylor | 382/187 |
| 2005/0128510 A1 | * | 6/2005 | Campbell | 358/1.15 |
| 2006/0020484 A1 | * | 1/2006 | Hugo | 705/1 |
| 2007/0272753 A1 | * | 11/2007 | Scanlon | 235/454 |
| 2008/0264701 A1 | * | 10/2008 | Radtke et al. | 178/19.01 |

* cited by examiner

*Primary Examiner* — Edwyn Labaze
(74) *Attorney, Agent, or Firm* — Kile Park Goekjian Reed & McManus PLLC

(57) ABSTRACT

A cheat preventing optical mark recognition (OMR) card capable of preventing cheating of examinees by configuring a marking part thereof such that marks formed on the marking part are not easily recognized from angles other than a right angle, that is, a front of the card. The cheat preventing OMR card includes the marking part and an answer checking section of the marking part includes a shaded background.

6 Claims, 7 Drawing Sheets

| SEAT NO. | SUBJECTIVE QUESTION SCORE | | NAME | | CHECK | 60-0 | | |
|---|---|---|---|---|---|---|---|---|
| | ⓪ ⓪.⓪ | 1 | ANSWER TO SUBJECTIVE QUESTION | | | | SCORE | |
| | ① ①.① | 2 | | | | | | |
| | ② ②.② | 3 | | | | | | * REFER TO BACK FOR FURTHER ESSENTIALS |
| | ③ ③.③ | 4 | | | | | | |
| | ④ ④.④ | 5 | | | | | | |
| | ⑤ ⑤.⑤ | 6 | | | | | | |
| | ⑥ ⑥.⑥ | 7 | | | | | | |
| | ⑦ ⑦.⑦ | 8 | | | | | | |
| | ⑧ ⑧.⑧ | 9 | | | | | | |
| | ⑨ ⑨.⑨ | 10 | | | | | | |
| | | NO SCRIPT ALLOWED UNDER LINE | | | | | | |

Fig.3A

THE ( )SEMESTER ( )EXAM

SUBJECT

| TYPE | GRADE | CLASS | SEAT NO. | SUBJECT CODE | ABSENCE | QUESTION NO. | ANSWER FORM |
|---|---|---|---|---|---|---|---|
| 0 | 0 | 0 0 | 0 0 | 0 0 | ○ | 1 | ● ● ● ❹ ● |
| 1 | 1 | 1 1 | 1 1 | 1 1 | ○ | 2 | ● ● ● ❹ ● |
| 2 | 2 | 2 2 | 2 2 | 2 2 | ○ | 3 | ● ● ● ❹ ● |
| 3 | 3 | 3 3 | 3 3 | 3 3 | ○ | 4 | ● ● ● ❹ ● |
| 4 |   | 4 4 | 4 4 | 4 4 | ○ | 5 | ● ● ● ❹ ● |
| 5 |   | 5 5 | 5 5 | 5 5 | ○ | 6 | ● ● ● ❹ ● |
| 6 |   | 6 6 | 6 6 | 6 6 |   | 7 | ● ● ● ❹ ● |
| 7 |   | 7 7 | 7 7 | 7 7 |   | 8 | ● ● ● ❹ ● |
| 8 |   |     | 8 8 | 1 8 |   | 9 | ● ● ● ❹ ● |
| 9 |   | 9 9 | 9 9 | 9 9 |   | 10 | ● ● ● ❹ ● |

| SEAT NO. | | NAME | | CHECK | 60-0 | |
|---|---|---|---|---|---|---|
| | SUBJECTIVE QUESTION SCORE | | ANSWER TO SUBJECTIVE QUESTION | | | SCORE |
| | 0  0 . 0 | 1 | | | | |
| | 1  1 . 1 | 2 | | | | |
| | 2  2 . 2 | 3 | | | | |
| | 3  3 . 3 | 4 | | | | |
| | 4  4 . 4 | 5 | | | | |
| | 5  5 . 5 | 6 | | | | |
| | 6  6 . 6 | 7 | | | | |
| | 7  7 . 7 | 8 | | | | |
| | 8  8 . 8 | 9 | | | | |
| | 9  9 . 9 | 10 | | | | |

* REFER TO BACK FOR FURTHER ESSENTIALS

NO SCRIPT ALLOWED UNDER LINE

CHEAT PREVENTING OMR CARDCHEAT PREVENTING OMR CARD

BACKGROUND OF THE INVENTION

1. Field of the Invention

The present invention relates to an optical mark recognition (OMR) card for preventing cheating, and more particularly to a cheat preventing OMR card capable of preventing cheating of other examinees by forming a marking part of the OMR card to include black shading dots so that marks on the marking part are not easily recognized as seen from angles other than a right angle, that is, a front of the OMR card.

2. Description of the Related Art

Generally, an optical mark recognition (OMR) refers to a reader system. After a user marks a plurality of marking parts on an OMR card with a writing tool such a computer pen, light is projected onto the marking parts and then the OMR detects intensity of the light being transmitted or reflected, using a light receiving element, thereby reading the marks. The OMR is usually used as an exam answering sheet or for inputting statistical analysis data due to its excellent speed and accuracy.

However, a conventional OMR card has a bright background color while the computer pen, that is, marking pen marks the OMR card with a dark color such as black. Therefore, since the marks made on the OMR card can easily be recognized even from a distance of about 6 m, people cheating on an exam are increasing and the influence of the cheating is becoming serious.

To this end, conventionally, diversification of exam papers into two or more types have been tried in order to prevent possibility of the cheating. In some cases, a very large place has been employed to perform an exam so that horizontal and vertical intervals among the seats can be maximized.

The aforementioned efforts are, however, not effective in fundamental prevention of the cheating.

As a result, consequently, a need for an improved OMR card is increasing, the OMR card capable of preventing the cheating from the first even in a narrow space and with a minimum number of exam monitors.

SUMMARY OF THE INVENTION

Therefore, the present invention has been made in view of the above problems, and it is an object of the present invention to provide a cheat preventing OMR card comprising a marking part that includes an answer checking section, wherein the answer checking section of the marking part comprises a shaded background and a number disposed in the background.

BRIEF DESCRIPTION OF THE DRAWINGS

The above and other objects, features and other advantages of the present invention will be more clearly understood from the following detailed description taken in conjunction with the accompanying drawings, in which:

FIG. 1A is a left portion of a plan view showing the structure of a cheat preventing OMR card according to an embodiment of the present invention;

FIG. 1C is a right portion of a plan view showing the structure of a cheat preventing OMR card according to an embodiment of the present invention;

FIG. 3A shows a left portion of a used state of the cheat preventing OMR card according to the embodiment of the present invention, in which the marking part is marked;

FIG. 3B shows a center portion of a used state of the cheat preventing OMR card according to the embodiment of the present invention, in which the marking part is marked; and FIG. 3C shows a right portion of a used state of the cheat preventing OMR card according to the embodiment of the present invention, in which the marking part is marked.

DETAILED DESCRIPTION OF THE PREFERRED EMBODIMENTS

Hereinafter, an exemplary embodiment of the present invention will be described in detail with reference to the accompanying drawings.

Figure 1A:
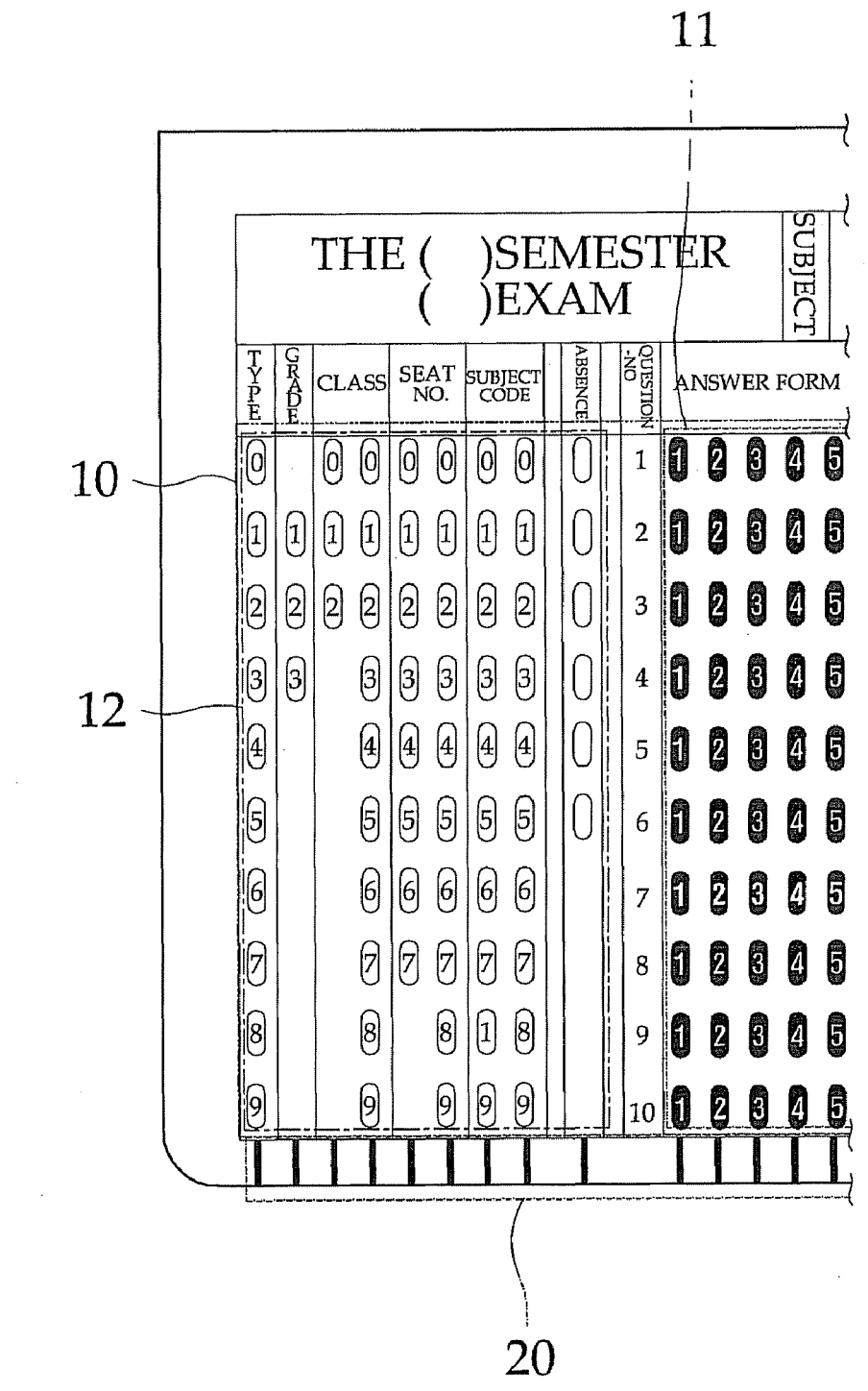
Figure 1B:
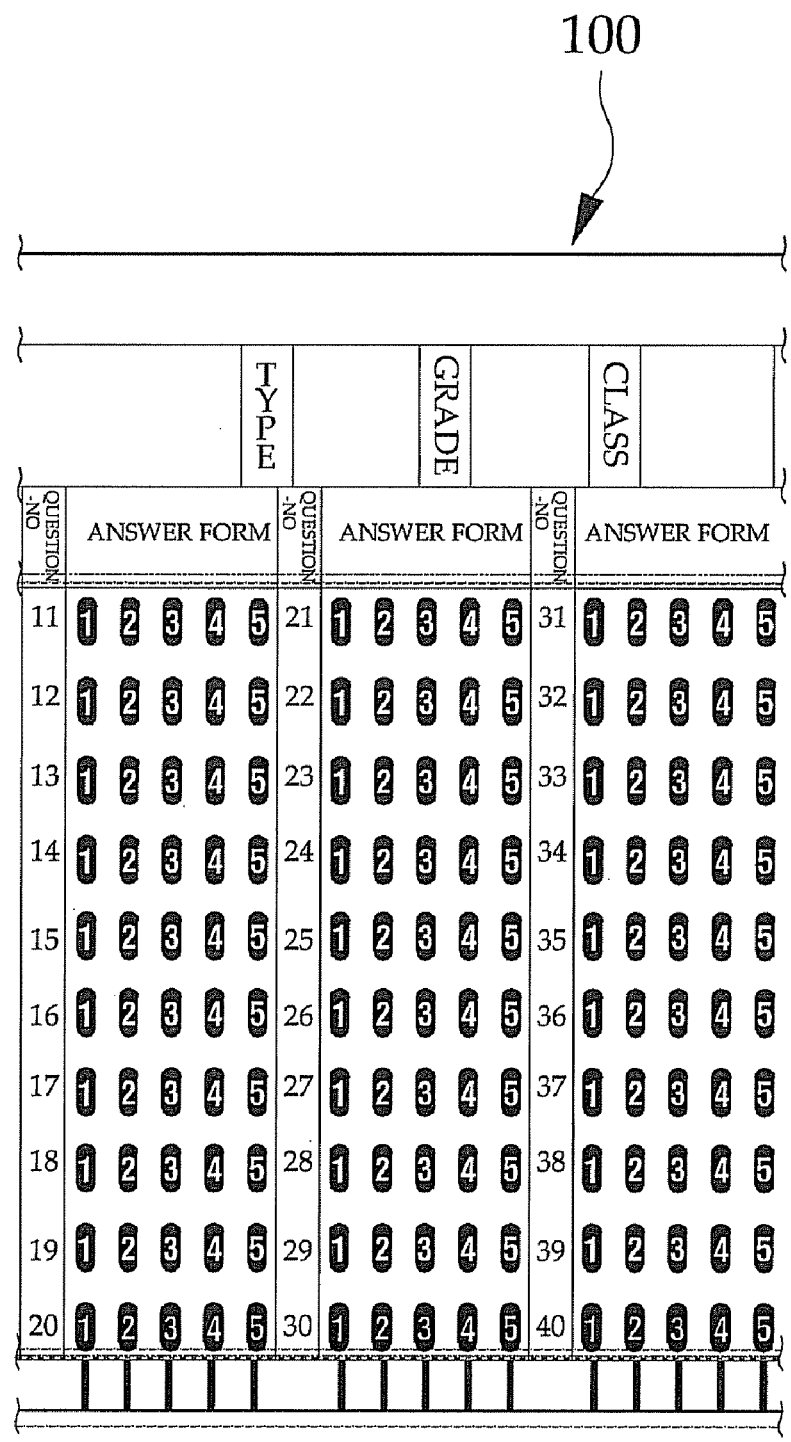
FIG. 1B is a center portion of a plan view showing the structure of a cheat preventing OMR card according to an embodiment of the present invention.
Figure 2:
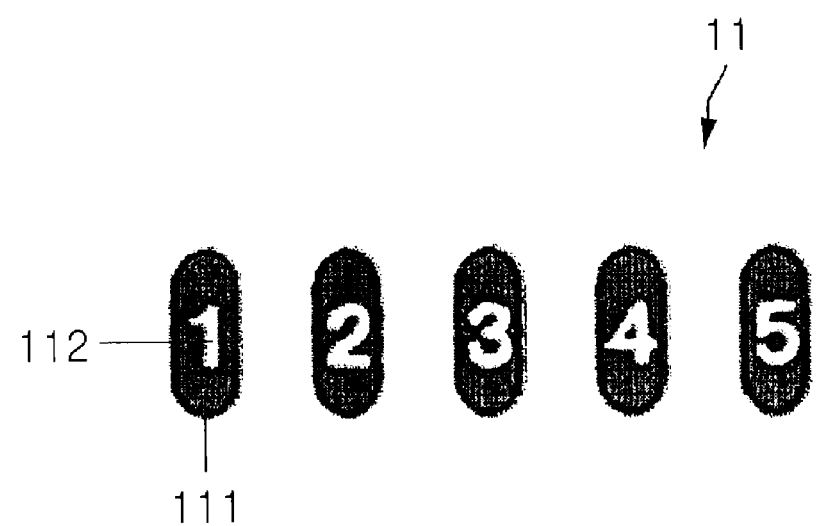
FIG. 2 is an enlarged perspective view of a marking part of the cheat preventing OMR card of FIG. 1.
Figure 3B:
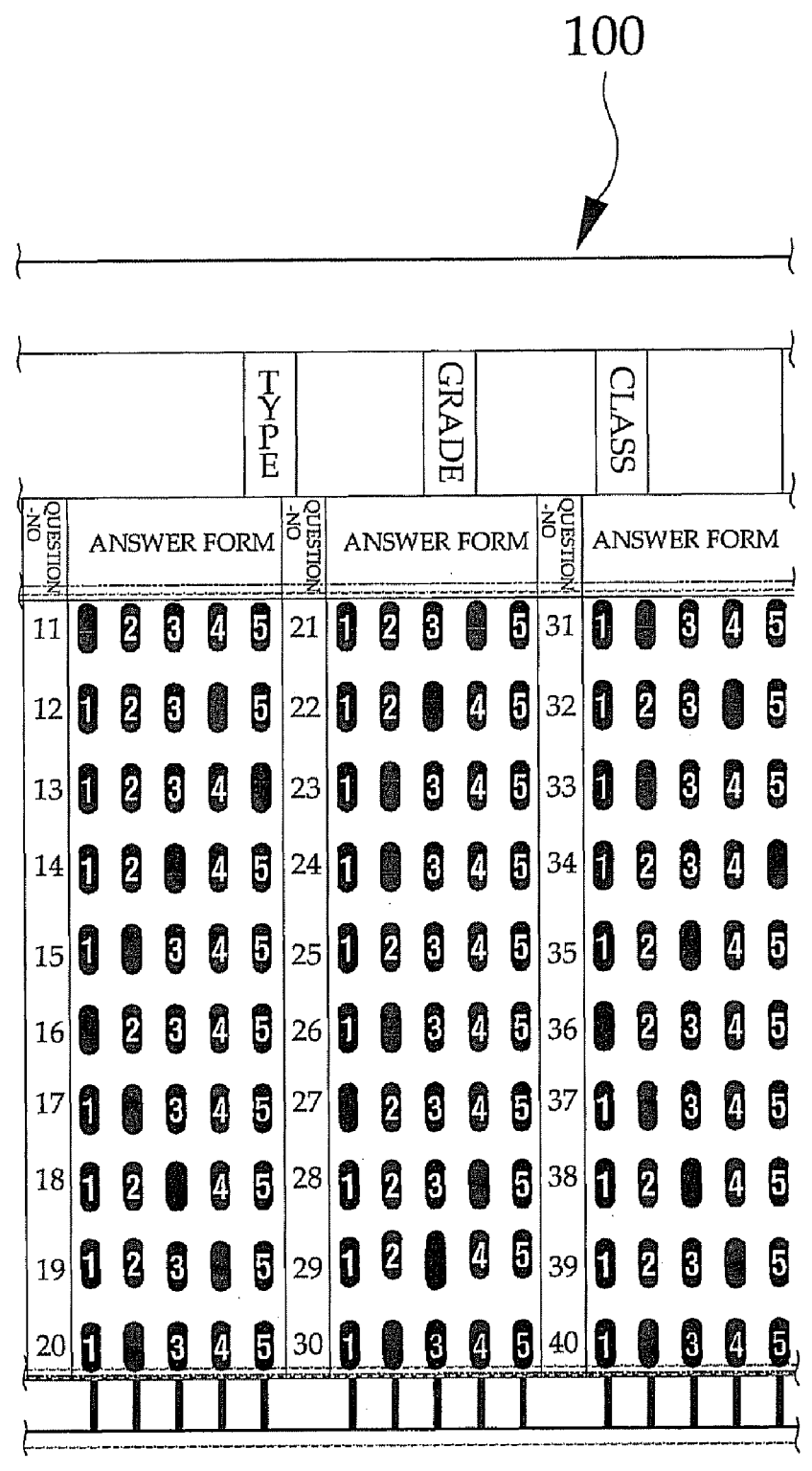

FIGS. 1A, 1B, and 1C are a plan structural view of a cheat preventing OMR card according to an embodiment of the present invention, and FIG. 2 is an enlarged perspective view of a marking part of the cheat preventing OMR card of FIGS. 1A, 1B, and 1C. FIGS. 3A, 3B, and 3C are a view showing a used state of the cheat preventing OMR card in which the marking part is marked.

As shown in FIG. 1A through FIG. 3C, the present invention provides a cheat preventing OMR card 100 in which a background of an answer checking section 11 of a marking part 10 is shaded such that the marks on the answer checking section 11 cannot easily be recognized as seen from angles other than a right angle, that is, the front of the OMR card 100. As a result, cheating among examinees can be prevented.

The OMR card 100 mainly comprises a marking part 10 to be marked with a computer pen, and a pre-marked part 20 printed with black marks so that visual points of the marks on the marking part 10 can be recognized by an OMR reader.

More specifically, the marking part 10 includes a recording section 12 for putting marks thereon about an examinee's information such as a name, a gender, a seat number and a paper type. The marking part 10 also includes the answer checking section 11 to be marked corresponding to answers of the exam. The recording section 12 and the answer checking section 11 are given outlines for guiding the user to check in the outlines using the computer pen.

The answer checking section 11 of the marking part 10 has a shaded background in which a number 112 is formed as a blank.

According to the embodiment of the present invention, the shaded background of the answer checking section 11 of the marking part 10 comprises black dots 111 formed by printing or screening. Preferably, density of the answer checking section 11 may be 50~80%.

The number 112 may be printed or screen-processed in white or another similar color so as to be easily recognized by the user.

Also, the density of the shaded background of the answer checking section 11 is not limited to 50~80% as described above. Depending on the circumstances including an interior lighting, day or night, and horizontal and vertical intervals among the examinees' seats, the density may be varied, for example, to 10~50% or 60~90%.

Thus, considering that the density of the shaded background of the answer checking section 11 determines recognizability of the number 112, numerical values of the density are suggested in claims of the present invention, as preferred density appropriate for preventing the marks on the answer checking section 11 from being easily recognized from angles other than a right angle, that is, the front side.

The pre-marked part 20 comprises bar marks printed on the OMR card 100 to detect visual points of marks in the recording section 12 and the answer checking section 11.

It is preferred that a printer contrast signal (PCS) value of the pre-marked part 20 is equal to or greater than 0.4 according to capabilities of readers recognizing the pre-marked part 20.

This is because the reader may not be able to read the bar marks if the PCS value of the pre-marked part 20 is less than 0.4.

However, it will be surely understood that the PCS value of the reader can be varied according to types of the reader. In addition, a PCS value of the marking part 10, which will be explained hereinafter, can also be varied.

Differently from the pre-marked part 20, the background of the answer checking section 11 needs to have a PCS value less than 0.4 so as not to be recognized by the reader before marked with the computer pen.

Accordingly, the density and the PCS value of the answer checking section 11 need to be set not to be detectable by the reader.

By this, as shown in FIGS. 3A, 3B, and 3C, when the answer checking section 11 is marked with the computer pen, the marks are not easily recognized as seen from angles other than a right angle, that is, the front side. As a consequence, cheating during an exam can be effectively prevented.

Although the answer checking section 11 of this embodiment includes numbers for multiple-choice selection, the cheat preventing OMR card according to the present invention is not limited to this. That is, any other numbering letters using Korean alphabets, English alphabets or the like can be adopted instead of the numbers.

As apparent from the above description, the present invention provides a cheat preventing OMR card capable of preventing marks made by a computer pen thereon from being easily distinguished from a background color of a marking part thereof by naked eyes when seen from angles other than a right angle, that is, the front of the OMR card, such that cheating during an exam can be prevented.

With the cheat preventing OMR card, cheating during an exam can be effectively prevented even at a small place, thereby saving the necessity of employing a large place.

In addition, the number of exam monitors for detecting cheaters can be minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cheat preventing OMR card comprising a marking part that includes an answer checking section, wherein the answer checking section of the marking part comprises:
    a plurality of dots each having a background of a first color, and
    a plurality of characters, each being formed in a corresponding one of the plurality of dots, the plurality of characters having a second color, wherein the first color is darker than the second color.

2. The cheat preventing OMR card according to claim 1, wherein the number is formed as a blank.

3. The cheat preventing OMR card according to claim 1 or claim 2, wherein the number is formed by printing or screening in white or another bright color.

4. The cheat preventing OMR card according to claim 1, wherein the shaded background of the answer checking section comprises black dots formed by printing or screening, and has density within a range of 5~80%.

5. The cheat preventing OMR card according to claim 1, wherein the marking part has a print contrast signal (PCS) value less than 0.4 such that marks on the marking part are not recognized by an OMR reader.

6. The cheat preventing OMR card according to claim 1, wherein the first color is black and the second color is white.

* * * * *